(12) United States Patent
Lesea

(10) Patent No.: US 9,847,323 B1
(45) Date of Patent: Dec. 19, 2017

(54) INTEGRATED CIRCUIT PACKAGE HAVING VOLTAGE REGULATION CIRCUITRY

(71) Applicant: Xilinx, Inc., San Jose, CA (US)

(72) Inventor: Austin H. Lesea, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 79 days.

(21) Appl. No.: 14/830,372

(22) Filed: Aug. 19, 2015

(51) Int. Cl.
| | |
|---|---|
| *H05K 7/10* | (2006.01) |
| *H05K 7/12* | (2006.01) |
| *H01L 25/18* | (2006.01) |
| *G06F 17/50* | (2006.01) |
| *H01L 23/498* | (2006.01) |
| *H01L 23/50* | (2006.01) |
| *H01L 23/00* | (2006.01) |
| *H05K 1/18* | (2006.01) |

(52) U.S. Cl.
CPC .......... *H01L 25/18* (2013.01); *G06F 17/5054* (2013.01); *H01L 23/49816* (2013.01); *H01L 23/49822* (2013.01); *H01L 23/49894* (2013.01); *H01L 23/50* (2013.01); *H01L 24/17* (2013.01); *H05K 1/181* (2013.01); *H01L 2224/16227* (2013.01); *H01L 2924/1427* (2013.01); *H01L 2924/1431* (2013.01)

(58) Field of Classification Search
USPC .................. 361/767, 752, 808; 174/557
See application file for complete search history.

(56) References Cited

U.S. PATENT DOCUMENTS

| | | | |
|---|---|---|---|
| 2012/0293972 A1* | 11/2012 | Pan | H01L 25/16 361/772 |
| 2014/0160688 A1* | 6/2014 | Lu | H01L 23/49816 361/728 |
| 2014/0312483 A1* | 10/2014 | Vo | H01L 25/0652 257/691 |

* cited by examiner

*Primary Examiner* — Andargie M Aychillhum
(74) *Attorney, Agent, or Firm* — Robert M. Brush; Keith Taboada (57) ABSTRACT

In an example, an IC package includes a package substrate including a plurality of bumps configured for coupling to a printed circuit board, the package substrate including a core disposed between a plurality of top-side conductive layers and a plurality of bottom-side conductive layers. The IC package further includes an IC die coupled to the package substrate and disposed on top of the plurality of top-side conductive layers. The IC die further includes a voltage regulator IC die disposed on the package substrate adjacent to the IC die, the voltage regulator IC die being coupled to the IC die using two of four top-most layers of the plurality of top-side conductive layers nearest the IC die.

13 Claims, 5 Drawing Sheets

INTEGRATED CIRCUIT PACKAGE HAVING VOLTAGE REGULATION CIRCUITRY

TECHNICAL FIELD

Examples of the present disclosure generally relate to electronic circuits and, in particular, to an integrated circuit package having voltage regulation circuitry.

BACKGROUND

Integrated circuits (ICs) have become increasingly complex, require more input/output (IO) pins and operating current on smaller die sizes. In a typical configuration, an IC is mounted to a printed circuit board (PCB) and coupled to an external voltage regulator on the PCB that provides a power source for the IC. During operation, an IC can suddenly draw a large current from the external voltage regulator. Such transients can cause voltage droop in the voltage provided by the voltage regulator, which can impact operation of the IC. Bypass capacitors can be provided on the PCB coupled to the voltage regulator in an attempt to mitigate the voltage droop. However, bypass capacitors typically only slightly reduce the magnitude of the voltage droop and will add to package ringing.

SUMMARY

Techniques for providing an integrated circuit (IC) package having voltage regulation circuitry are described. In an example, an IC package includes a package substrate including a plurality of bumps configured for coupling to a printed circuit board, the package substrate including a core disposed between a plurality of top-side conductive layers and a plurality of bottom-side conductive layers. The IC package further includes an IC die coupled to the package substrate and disposed on top of the plurality of top-side conductive layers. The IC die further includes a voltage regulator IC die disposed on the package substrate adjacent to the IC die, the voltage regulator IC die being coupled to the IC die using two of four top-most layers of the plurality of top-side conductive layers nearest the IC die.

In another example, a printed circuit board (PCB) includes a power supply and a multi-chip module coupled to the power supply. The multi-chip module includes a package substrate including a plurality of bumps configured for coupling to conductive pads of the printed circuit board, the package substrate including a core disposed between a plurality of top-side conductive layers and a plurality of bottom-side conductive layers. The multi-chip module further includes an IC die coupled to the package substrate and disposed on top of the plurality of top-side conductive layers. The multi-chip module further includes a voltage regulator IC die disposed on the package substrate adjacent to the IC die, the voltage regulator IC die being coupled to the IC die using two of four top-most layers of the plurality of top-side conductive layers nearest the IC die, the voltage regulator IC die being electrically coupled to the power supply.

In another example, a method of designing a circuit for a programmable integrated circuit (IC) is described. The programmable IC is disposed in a package on a package substrate adjacent to voltage regulation circuitry disposed on the package substrate. The method includes generating an implementation of a circuit design for the programmable IC. The method further includes determining power consumption of the implementation for a plurality of operational states. The method further includes generating control data for the voltage regulation circuitry. The method further includes generating a configuration bitstream to configure the programmable IC with the implementation of the circuit design and to control the voltage regulation circuitry based on the control data.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

Techniques for providing an integrated circuit (IC) package having voltage regulation circuitry are described. In an example, an IC die is coupled to a package substrate. The package substrate includes a core disposed between a plurality of top-side conductive layers and a plurality of bottom-side conductive layers. For example, the package substrate can be a 16 layer substrate having 8 top-side conductive layers and 8 bottom-side conductive layers. In another example, the plurality of top-side conductive layers can include at least five conductive layers. Other package substrates can have more or less layers, such as 18 or 20 total layers (e.g., 9 or 10 on each side of the core). The IC die is disposed on top of the at least five top-side conductive layers. The IC package further includes a voltage regulator die adjacent to the IC die and coupled to the IC die using two of the four top-most layers of the at least five top-side conductive layers nearest the IC die. The series inductance of power and ground to the IC die determine the depth of the voltage droop due to current transients. By using two of the top four conductive layers nearest the IC die, the series inductance between the voltage regulator die and the IC package is minimized. Further, use of the voltage regulator IC die within the IC package (e.g., internal voltage regulator) as opposed to use of an external voltage regulator removes any need for bypass capacitors (also referred to as decoupling capacitors) on the PCB. These and further aspects are described below with respect to the following figures.

Figure 1:
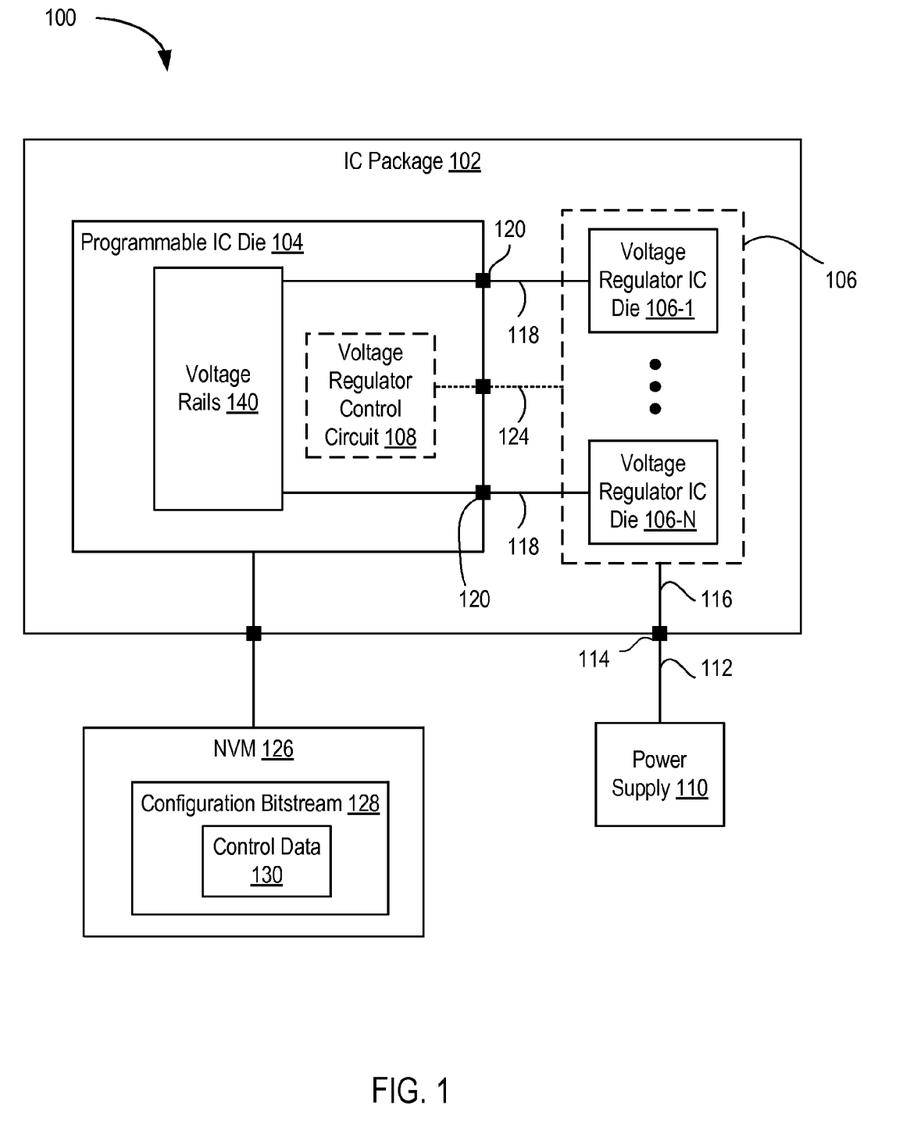
FIG. 1 is a block diagram depicting a high-level view of a printed circuit board (PCB) according to an example.

FIG. 1 is a block diagram depicting a high-level view of a printed circuit board (PCB) 100 according to an example. The PCB 100 includes an IC package 102 and a power supply 110. The IC package 102 comprises a multi-chip module (MCM) having an IC die, which in the present example is a programmable IC die 104, and voltage regulator IC die 106-1 through 106-N (collectively voltage regulator IC die 106). The programmable IC die 104 can include a field programmable gate array (FPGA), complex programmable logic device (CPLD), and the like. An example of an FPGA architecture is described below with respect to FIG. 6. While several examples are described herein with respect to use of a programmable IC, it is to be understood that other types of ICs can be used along with internal voltage regulator(s) in an IC package, such as application specific integrated circuits (ASICs).

The power supply 110 is coupled to the IC package 102 by conductors 112 on the PCB 100. The power supply 110 can be implemented using any type of known circuit or circuits for supply current at a particular voltage. The power supply 110 can be unregulated or can include coarse voltage regulation. However, in the example, the programmable IC die 104 is not coupled directly to the power supply 110 for receiving its output voltage. Rather, the power supply 110 is coupled to the voltage regulator IC die 106.

In particular, the conductors 112 electrically couple the power supply 110 to bumps 114. The power supply 110 can provide both power and ground to the IC package 102 through the conductors 112 and the bumps 114. Power includes current driven at a particular voltage (potential) with respect to the ground. The voltage regulator IC die 106 can be coupled to the bumps 114 through conductors 116 of the IC package 102. In this manner, the voltage regulator IC die 106 can receive power and ground from the power supply 110. In an example, the PCB 100 does not include any bypass capacitors (decoupling capacitors) external to the IC package 102 and coupled to the conductors 112. That is, in an example, the power supply 110 can provide power and ground to the IC package 102 without the use of bypass capacitors. As discussed further below, such bypass capacitors can be omitted due to the internal voltage regulation provided by the voltage regulator IC die 106.

Each of the voltage regulator IC die 106 comprises a circuit or circuits for regulating the voltage provided by the power supply 110. Such voltage regulation circuits are well-known in the art. The voltage regulator IC die 106 are coupled to the programmable IC die 104 through conductors 118 in the IC package 102. The conductors 118 are coupled to bumps 120 of the programmable IC die 104. The bumps 120 can be coupled to voltage rails 140 in the programmable IC die 104. In this manner, the voltage regulator IC die 106 can provide regulated power and ground to the programmable IC die 104.

As discussed further below, the IC package 102 can include a plurality of conductive layers. In an example, the IC package 102 includes at least five conductive layers on the top-side of a central core. In an example, the conductors 118 are disposed on two of the four top-most conductive layers nearest the programmable IC die. By using two of the four top-most conductive layers, the series inductance between the voltage regulator IC die 106 and the programmable IC die 104 is minimized. Minimizing such series inductance reduces the magnitude of voltage droop due to current transients. The series inductance between the voltage regulator IC die 106 and the IC package 102 can be such that no bypass capacitors are needed on the PCB 100. As such, as discussed above, bypass capacitors can be omitted from the PCB 100. Removing the bypass capacitors from being coupled to the conductors 112 as the advantage of reducing or eliminating package ringing.

In an example, the programmable IC die 104 includes an optional voltage regulator control circuit 108. The voltage regulator control circuit 108 can be configured in the programmable fabric of the programmable IC die 104 by loading a configuration bitstream into the programmable IC die 104. Alternatively, the voltage regulator control circuit 108 can be dedicated circuitry disposed alongside the programmable fabric of the programmable IC die 104. The voltage regulator control circuit 108 can generate analog or digital control signals for controlling the voltage regulator IC die 106. The voltage regulator control circuit 108 can provide the control signals to the voltage regulator IC die 106 through the conductors 118, or through other conductors 124 in the IC package 102. If used, the conductors 124 are not restricted to the four top-most conductive layers of the IC package 102. In an example, the control signals can be used to turn on or off individual ones of the voltage regulator IC die 106.

In an example, the voltage regulator control circuit 108 generates the control signals based at least in part on control data 130. In an example, the voltage regulator control circuit 108 can receive the control data for generating the control signals from loading of a configuration bitstream 128 into the programmable IC die 104. The configuration bitstream 128 can be stored in a non-volatile memory (NVM) 126 on the PCB 100 or obtained from some other source. As described below with respect to FIG. 6, the configuration bitstream can be stored in configuration memory of the programmable IC die 104 and accessed by the voltage regulator control circuit 108. In other examples, the voltage regulator control circuit 108 can receive the control data 130 from another source that provides input to the programmable IC die 104. In an example, the control data can cause the voltage regulator control circuit 108 to monitor for, or otherwise receive, events from other circuit(s) in the programmable IC die 104. The voltage regulator control circuit 108 can generate the control signals based on the control data and one or more events.

The voltage regulator control circuit 108 can be used to dynamically turn on and off individual ones of the voltage regulator IC die 106 as the programmable IC die 104 transitions between operational states. That is, the programmable IC die 104 can be capable of operating in a plurality of different operational states, some or all of which can exhibit different power consumption. When the programmable IC die 104 is about to transition from one operational state to another operational state having a higher power consumption, the voltage regulator control circuit 108 can, based on the control data 130 and/or monitored event(s), turn on one or more of the voltage regulator IC die 106. This mitigates voltage droop by providing additional current source(s) at a time when the programmable IC die 104 is about to draw additional current. Conversely, when the programmable IC die 104 is about to transition to an operational state having a lower power consumption, the voltage regulator control circuit 108 can, based on the control data and/or monitored event(s), turn off one or more of the voltage regulator IC die 106. This conserves power by turning off unnecessary voltage regulators at a time when the programmable IC die 104 is about to draw less current.

Figure 2:
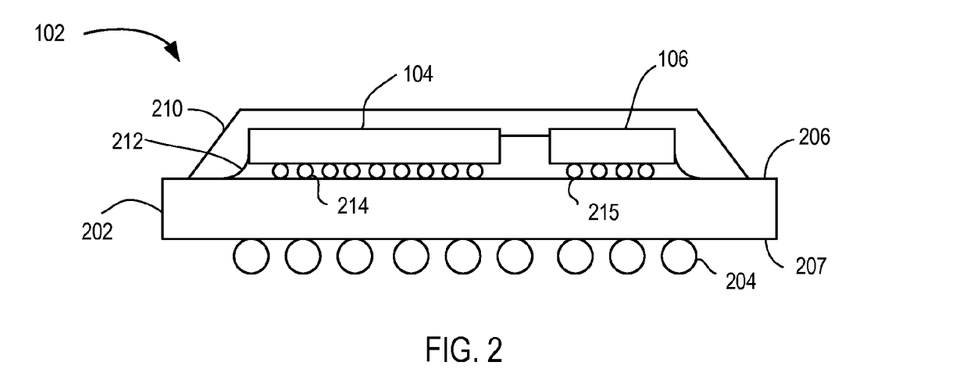
FIG. 2 is a cross-section of the IC package according to an example.

FIG. 2 is a cross-section of the IC package 102 according to an example. The IC package 102 includes a package substrate 202 having a plurality of bumps 204 configured for coupling to the PCB 100. An example of the package substrate 202 is described below with respect to FIG. 3. In an example, the package substrate 202 can be an organic substrate. Some of the bumps 204 can include the bumps 114 for receiving power and ground from the power supply 110. The programmable IC die 104 and the voltage regulator IC die 106 are disposed on what is referred to herein as a top side 206 of the package substrate 202. The bumps 204 are disposed on what is referred to herein as a bottom side 207 of the package substrate 202. The package substrate 202 includes conductive layers that, as described below, electrically couple the bumps 204 to bumps 214 of the programmable IC die 104 and bumps 215 of the voltage regulator IC die 106. The conductive layers of the package substrate 202 also electrically couple some of the bumps 214 of the programmable IC die 104 to some of the bumps 215 of the voltage regulator IC die 106. The IC package 102 can include other conventional components, such as underfill 212 disposed around the programmable IC die 104 and the voltage regulator IC die 106 and a lid 210 disposed over the programmable IC die 104 and the voltage regulator IC die 106. While only one voltage regulator IC die 106 is shown in the example of FIG. 2, other(s) of the voltage regulator IC die 106 can be configured similarly.

Figure 3:
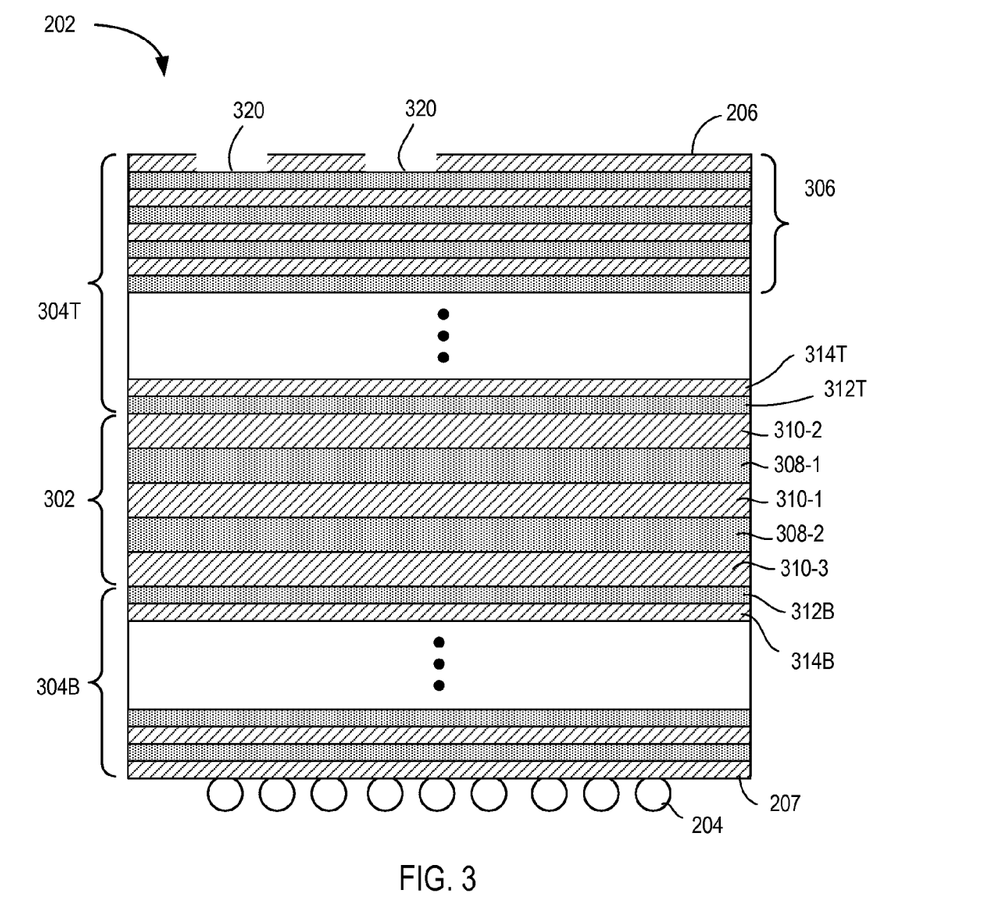
FIG. 3 is a cross-section of the package substrate according to an example.

FIG. 3 is a cross-section of the package substrate 202 according to an example. The package substrate 202 includes a core 302, top-side conductive layers 304T, and bottom-side conductive layers 304B. The core 302 comprises at least two metal layers 308 (e.g., two metal layers 308-1 and 308-2 are shown) and at least three dielectric layers 310 (e.g., three dielectric layers 310-1 through 310-3 are shown). The metal layers 308 and the dielectric layers 310 can be thicker than the metal and dielectric layers of the top-side conductive layers 304T and the bottom-side conductive layers 304B.

The top-side conductive layers 304T include an alternating stack of conductive layers 312T and dielectric layers 314T. In an example, the top-side conductive layers 304T can include a plurality of conductive layers 312T, such as at least five conductive layers, as eight conductive layers, nine conductive layers, ten conductive layers, or more. In another example, the top-side conductive layers 304T can include at least eight conductive layers 312T. A portion 306 of the top-side conductive layers 304T includes the four top-most conductive layers 312T. As discussed above, the programmable IC die 104 can be coupled to the voltage regulator IC die 106 using two of the four top-most conductive layers 312T in the portion 306. The bottom-side conductive layers 304B include an alternating stack of conductive layers 312B and dielectric layers 314B. The bottom-side conductive layers 304B can include a plurality of the conductive layers 312B, such as eight layers, nine layers, ten layers, or more. In another example, the bottom-side conductive layers 304B can include at least eight conductive layers 312B. The top-most conductive layer in the portion 306 of the top-side conductive layers 304T can include a plurality of pads 320 configured for contact with bumps of an IC die, such as the bumps 214 and the bumps 215.

Figure 4:
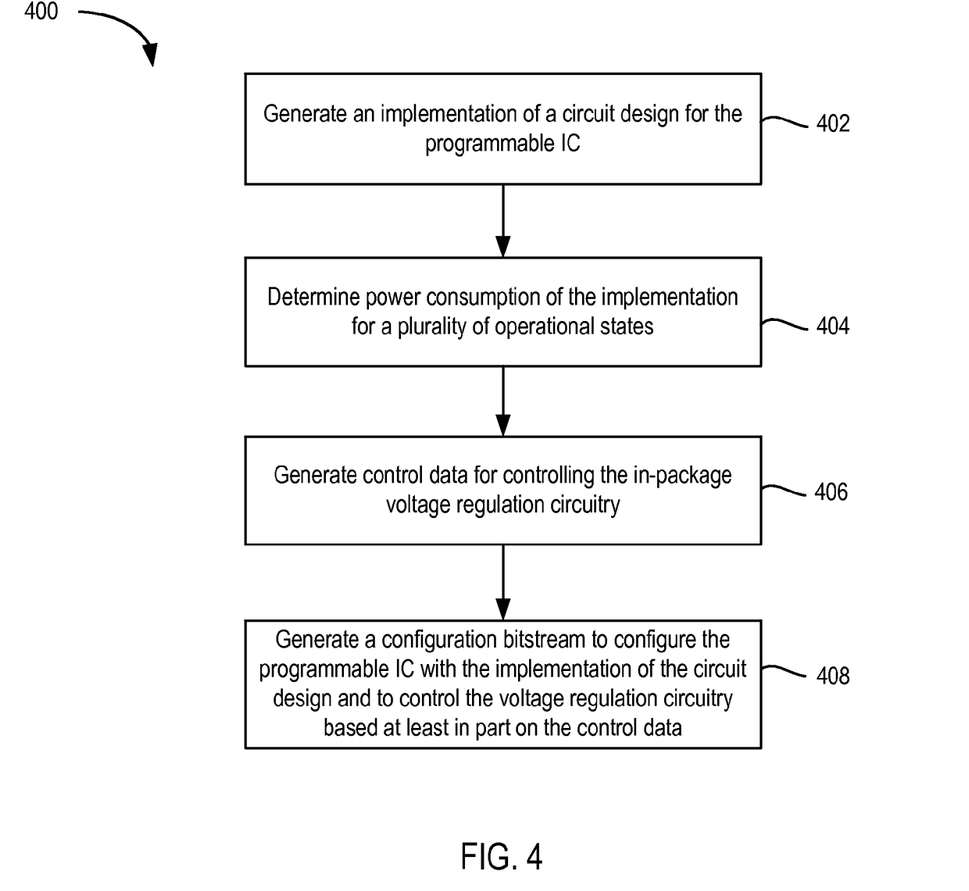
FIG. 4 is a flow diagram depicting a method of designing a circuit for a programmable IC according to an example.

FIG. 4 is a flow diagram depicting a method 400 of designing a circuit for a programmable IC according to an example. The method 400 can be used to design a circuit for the programmable IC die 104 as shown in FIG. 1. The method 400 can be performed by a circuit design tool 510, as shown in the example computer system 500 of FIG. 5. At block 402, the circuit design tool 510 generates an implementation of a circuit design for the programmable IC. A circuit design can be specified using various levels of abstraction, such as a high-level block model of the circuit design, a lower level hardware description language (HDL) model of the circuit design, or the like. The circuit design tool 510 generates an implementation of the circuit design for the programmable IC die 104, such as a netlist that is mapped, placed, and routed for the programmable IC.

At block 404, the circuit design tool 510 determines power consumption of the implementation for a plurality of operational states. The implementation of the circuit design in the programmable IC die 104 can consume different amounts of power across different operational states. For example, in one operational state, a particular circuit or particular circuits can be inactive or off, and in another operation state such circuit(s) can be active or on. The activation of circuit(s) during operation can increase the current drawn by the programmable IC die 104. As such, different operational states can draw different amounts of current. The circuit design tool 510 can estimate power consumption for the different operational states of the circuit design implementation based on a model of the programmable IC die 104.

At block 406, the circuit design tool 510 generates control data for controlling the in-package voltage regulation circuitry (e.g., the voltage regulator IC die 106). At block 408, the circuit design tool 510 generates a configuration bitstream to configure the programmable IC die 104 with the implementation of the circuit design and to control the in-package voltage regulation circuitry based at least in part on the control data. In an example, as described above, the programmable IC die 104 includes the voltage regulator control circuit 108 that controls the in-package voltage regulation circuitry based at least in part on the control data generated at block 406. In an example, the voltage regulator control circuit 108 can be configured in the programmable fabric of the programmable IC die 104 by the configuration bitstream. Alternatively, the voltage regulator control circuit 108 can be dedicated circuitry in the programmable IC die 104 alongside the programmable fabric. In either case, the control data is used to set the voltage regulator control circuit 108 to generate the control signals for controlling the in-package voltage regulation circuitry. The control data can also cause the voltage regulator control circuit 108 to monitor circuit(s) in the programmable IC die 104 for indications of changes in operational states ("events"). Based on the control data, the voltage regulator control circuit 108 can detect events and generate control signals for turning on or off the voltage regulator IC die 106 of the in-package voltage regulation circuitry.

In an example, the plurality of operational states includes a first operational state having a first power consumption and a second operational state having a second power consumption, where the second power consumption is greater than the first power consumption. The control data includes first control data to turn on a first voltage regulator of the in-package voltage regulation circuitry and second control data to turn on at least one additional voltage regulator of the in-package voltage regulation circuitry. In an example, the control data controls the voltage regulator control circuit 108 of the programmable IC die 104 to turn on at least one voltage regulator IC die 106 prior to an increase in current draw associated with a transition from a first operational state to a second operational state. In another example, the control data controls the voltage regulator control circuit 108 of the programmable IC die 104 to turn off at least one voltage regulator IC die 106 prior to a decrease in current draw associated with a transition from one operation state to another operational state.

Figure 5:
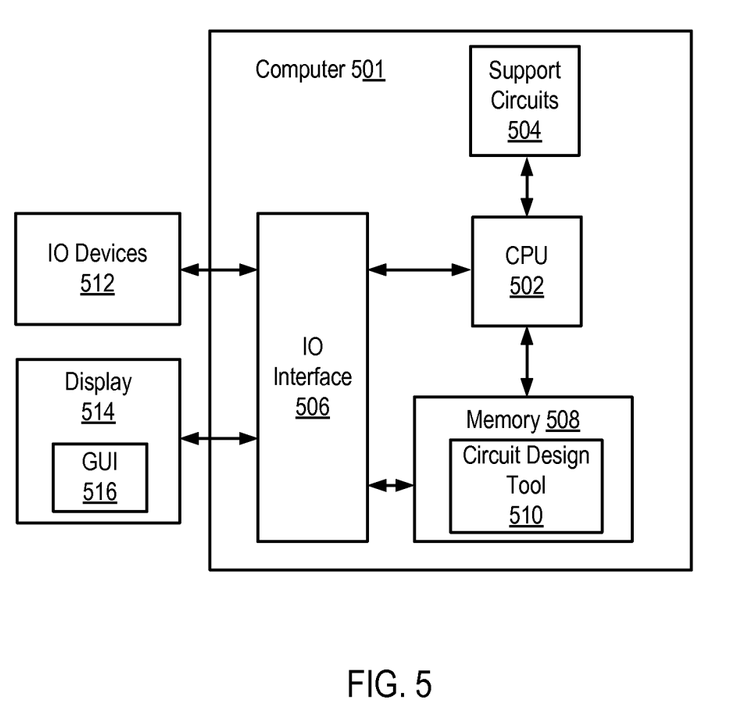
FIG. 5 is a block diagram depicting a computer suitable for implementing the methods and systems described herein.

FIG. 5 is a block diagram depicting a computer system 500 suitable for implementing the methods and systems described herein. The computer system 500 includes a central processing unit (CPU) 502, a memory 508, various support circuits 504, and an IO interface 506. The CPU 502 can include one or more microprocessors. The support circuits 504 can include conventional cache, power supplies, clock circuits, data registers, IO interfaces, and the like. The IO interface 506 may be directly coupled to the memory 508 or coupled through the CPU 502. The IO interface 506 can be coupled to various IO devices 511, such as conventional keyboard, mouse, printer, and the like, as well as a display 512. The display 512 can be used to present a GUI, such as the GUI 518.

The memory 508 may store all or portions of one or more programs and/or data to implement the systems and methods described herein. For example, the memory 508 can store programs for implementing the circuit design tool 510 that performs the method 400 described above. The memory 508 can include one or more of random access memory (RAM), read only memory (ROM), magnetic read/write memory, and the like.

Figure 6:
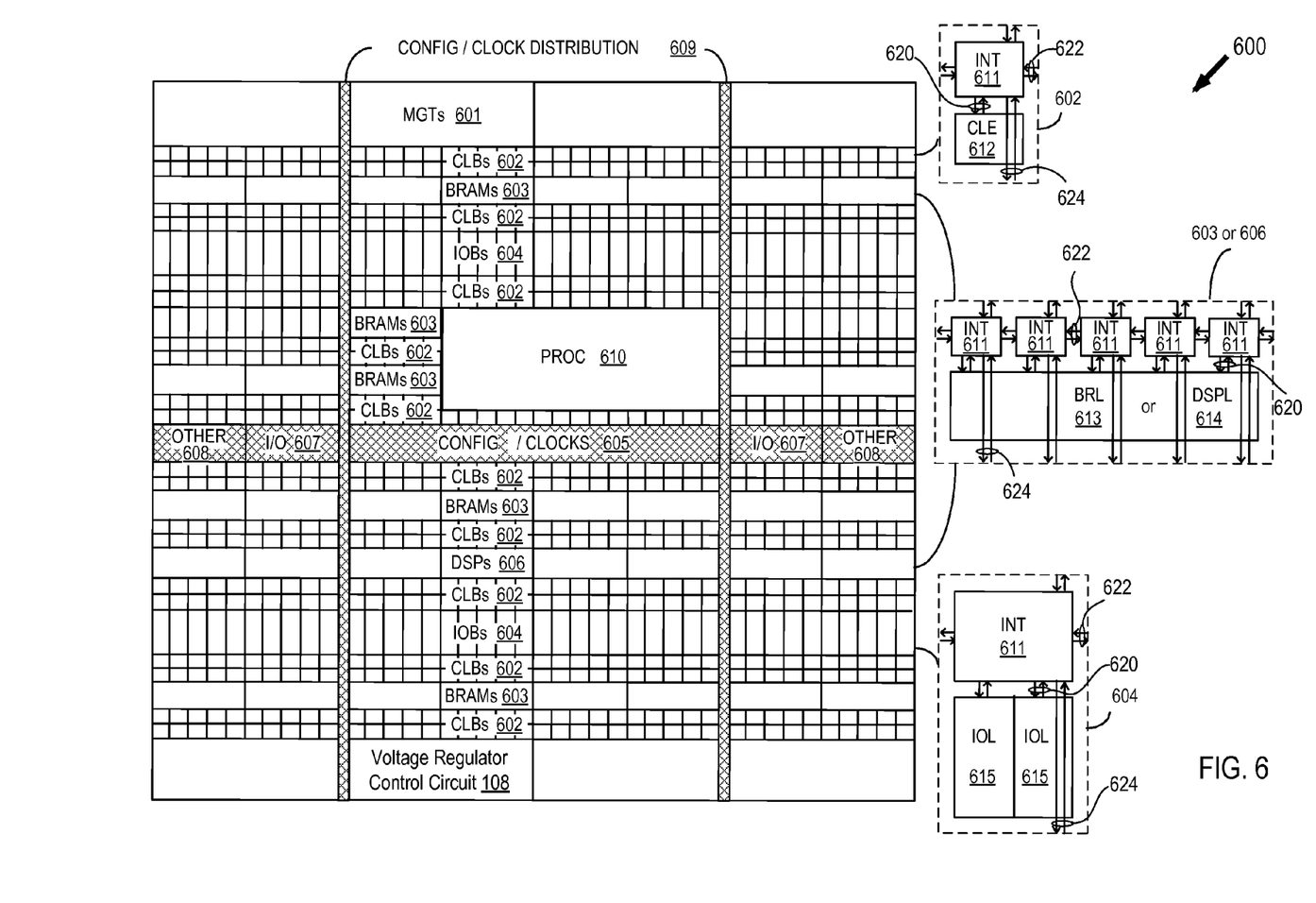
FIG. 6 illustrates a field programmable gate array (FPGA) architecture.

FIG. 6 illustrates an FPGA architecture 600 that includes a large number of different programmable tiles including multi-gigabit transceivers ("MGTs") 601, configurable logic blocks ("CLBs") 602, random access memory blocks ("BRAMs") 603, input/output blocks ("IOBs") 604, configuration and clocking logic ("CONFIG/CLOCKS") 605, digital signal processing blocks ("DSPs") 606, specialized input/output blocks ("I/O") 607 (e.g., configuration ports and clock ports), and other programmable logic 608 such as digital clock managers, analog-to-digital converters, system monitoring logic, and so forth. Some FPGAs also include dedicated processor blocks ("PROC") 610.

In some FPGAs, each programmable tile can include at least one programmable interconnect element ("INT") 611 having connections to input and output terminals 620 of a programmable logic element within the same tile, as shown by examples included at the top of FIG. 6. Each programmable interconnect element 611 can also include connections to interconnect segments 622 of adjacent programmable interconnect element(s) in the same tile or other tile(s). Each programmable interconnect element 611 can also include connections to interconnect segments 624 of general routing resources between logic blocks (not shown). The general routing resources can include routing channels between logic blocks (not shown) comprising tracks of interconnect segments (e.g., interconnect segments 624) and switch blocks (not shown) for connecting interconnect segments. The interconnect segments of the general routing resources (e.g., interconnect segments 624) can span one or more logic blocks. The programmable interconnect elements 611 taken together with the general routing resources implement a programmable interconnect structure ("programmable interconnect") for the illustrated FPGA.

In an example implementation, a CLB 602 can include a configurable logic element ("CLE") 612 that can be programmed to implement user logic plus a single programmable interconnect element ("INT") 611. A BRAM 603 can include a BRAM logic element ("BRL") 613 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 606 can include a DSP logic element ("DSPL") 614 in addition to an appropriate number of programmable interconnect elements. An IOB 604 can include, for example, two instances of an input/output logic element ("IOL") 615 in addition to one instance of the programmable interconnect element 611. As will be clear to those of skill in the art, the actual I/O pads connected, for example, to the I/O logic element 615 typically are not confined to the area of the input/output logic element 615.

In the pictured example, a horizontal area near the center of the die (shown in FIG. 6) is used for configuration, clock, and other control logic. Vertical columns 609 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, processor block 610 spans several columns of CLBs and BRAMs. The processor block 610 can various components ranging from a single microprocessor to a complete programmable processing system of microprocessor(s), memory controllers, peripherals, and the like.

Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

The programmable IC die 104 can include circuitry similar to the architecture 600 described above. In an example, the architecture 600 can be configured to implement the voltage regulator control circuit 108. Alternatively, the voltage regulator control circuit 108 can be dedicated circuitry alongside the programmable fabric discussed above.

While the foregoing is directed to specific examples, other and further examples may be devised without departing from the basic scope thereof, and the scope thereof is determined by the claims that follow.

What is claimed is:
1. An integrated circuit (IC) package, comprising:
a package substrate including a plurality of bumps configured for coupling to a printed circuit board, the package substrate including a core disposed between a plurality of top-side conductive layers and a plurality of bottom-side conductive layers;

an IC die coupled to the package substrate and disposed on top of the plurality of top-side conductive layers, the IC die including a first plurality of contacts directly coupled to a first plurality of pads of a top-most conductive layer of the plurality of top-side conductive layers; and a voltage regulator IC die disposed on the package substrate adjacent to the IC die, the voltage regulator IC die including a second plurality of contacts directly coupled to a second plurality of pads of the top-most conductive layer, the voltage regulator IC die being coupled to the IC die using two of four top-most layers of the plurality of conductive layers nearest the IC die.

2. The IC package of claim 1, wherein the plurality of top-side conductive layers comprise at least eight top-side conductive layers, and wherein the plurality of bottom-side conductive layers comprises at least eight bottom-side conductive layers.

3. The IC package of claim 1, further comprising:
at least one additional voltage regulator IC die disposed on the package substrate adjacent to the IC die, each of the at least one additional voltage regulator IC die being coupled to the IC die using the two of the four top-most layers of the plurality of top-side conductive layers nearest the IC die.

4. The IC package of claim 3, wherein the IC die comprises a programmable IC having programmable logic coupled to a plurality of voltage rails provided by the voltage regulator IC die and the at least one voltage regulator IC die.

5. The IC package of claim 1, wherein the package substrate comprises an organic substrate.

6. The IC package of claim 1, wherein the core comprises a stack of at least two metal layers and at least three dielectric layers.

7. A printed circuit board (PCB), comprising:
a power supply; and
a multi-chip module coupled to the power supply, the multi-chip module including:
a package substrate including a plurality of bumps configured for coupling to conductive pads of the printed circuit board, the package substrate including a core disposed between a plurality of conductive layers and a plurality of bottom-side conductive layers;

an IC die coupled to the package substrate and disposed on top of the plurality of top-side conductive layers, the IC die including a first plurality of contacts directly coupled to a first plurality of Dads of a top-most conductive layer of the plurality of top-side conductive layers; and a voltage regulator IC die disposed on the package substrate adjacent to the IC die, the voltage regulator IC die including a second plurality of contacts directly coupled to a second plurality of pads of the top-most conductive layer, the voltage regulator IC die being coupled to the IC die using two of four top-most layers of the plurality of top-side conductive layers nearest the IC die, the voltage regulator IC die being electrically coupled to the power supply.

8. The PCB of claim 7, wherein the plurality of conductive layers comprise at least eight top-side conductive layers, and wherein the plurality of bottom-side conductive layers comprises at least eight bottom-side conductive layers.

9. The PCB of claim 7, further comprising:
at least one additional voltage regulator IC die disposed on the package substrate adjacent to the IC die, each of the at least one additional voltage regulator IC die being coupled to the IC die using the two of the four top-most layers of the plurality of top-side conductive layers nearest the IC die, the at least one additional voltage regulator IC die being electrically coupled to the power supply.

10. The PCB of claim 9, wherein the IC die comprises a programmable IC having programmable logic coupled to a plurality of voltage rails provided by the voltage regulator IC die and the at least one voltage regulator IC die.

11. The PCB of claim 7, wherein the package substrate comprises an organic substrate.

12. The PCB of claim 1, wherein the core comprises a stack of at least two metal layers and at least three dielectric layers.

13. The PCB of claim 1, wherein the power supply is coupled to the multi-chip module without decoupling capacitors on the PCB.

* * * * *